United States Patent
Bozak et al.

(10) Patent No.: US 7,516,200 B2
(45) Date of Patent: Apr. 7, 2009

(54) AGGREGATION AND INTEGRATION SCHEME FOR GRID RELEVANT CUSTOMIZATION INFORMATION

(75) Inventors: Erol Bozak, Pforzheim (DE); Alexander Gebhart, Bad Schoenborn (DE)

(73) Assignee: SAP AG., Walldorf (DE)

( * ) Notice: Subject to any disclaimer, the term of this patent is extended or adjusted under 35 U.S.C. 154(b) by 959 days.

(21) Appl. No.: 10/739,992

(22) Filed: Dec. 18, 2003

(65) Prior Publication Data

US 2005/0138147 A1    Jun. 23, 2005

(51) Int. Cl.
*G06F 15/177* (2006.01)
(52) U.S. Cl. .................. 709/221; 709/220
(58) Field of Classification Search .......... 709/220, 709/248, 226; 717/171, 162
See application file for complete search history.

(56) References Cited

U.S. PATENT DOCUMENTS 4,780,821 A * 10/1988 Crossley .................. 718/100
6,049,673 A * 4/2000 McComb et al. .......... 717/164

FOREIGN PATENT DOCUMENTS

JP           08314872 A   * 11/1996

* cited by examiner

*Primary Examiner*—Salad Abdullahi
*Assistant Examiner*—Madhu Khanna
(74) *Attorney, Agent, or Firm*—Finnegan, Henderson, Farabow, Garrett & Dunner LLP

(57) ABSTRACT

A system and a method includes storing one or more configuration element entries in a definition scheme on a computer system included in a grid computer network. The configuration element entry includes data used by a program included in the computer system in the grid computer network to locate and access application specific customization data associated with an application on the computer system. The system and method also includes accessing the entries in the definition scheme for the application such that the program accesses the customization data using the definition scheme and the configuration element entries.

22 Claims, 5 Drawing Sheets

AGGREGATION AND INTEGRATION SCHEME FOR GRID RELEVANT CUSTOMIZATION INFORMATION

TECHNICAL FIELD

The present invention relates to data processing by digital computer, and more particularly to a grid computing definition scheme.

BACKGROUND

In today's data centers, the clusters of servers in a client-server network that run business applications often do a poor job of managing unpredictable workloads. One server may sit idle, while another is constrained. This leads to a "Catch-22" where companies, needing to avoid network bottlenecks and safeguard connectivity with customers, business partners and employees, often plan for the highest spikes in workload demand, and watch as those surplus servers operate well under capacity most of the time.

In grid computing, all of the disparate computers and systems in an organization or among organizations become one large, integrated computing system. That single integrated system can handle problems and processes too large and intensive for any single computer to easily handle in an efficient manner.

More specifically, grid computing is a form of distributed system wherein computing resources are shared across networks. Grid computing enables the selection, aggregation, and sharing of information resources resident in multiple administrative domains and across geographic areas. These information resources are shared, for example, based upon their availability, capability, and cost, as well as a user's quality of service (QoS) requirements. Grid computing can mean reduced cost of ownership, aggregated and improved efficiency of computing, data, and storage resources, and enablement of virtual organizations for applications and data sharing.

SUMMARY

In one aspect, the invention features a system and a method for storing one or more configuration element entries in a definition scheme on a computer system included in a grid computer network. The configuration element entry includes data used by a program included in the computer system in the grid computer network to locate and access application specific customization data associated with an application on the computer system. The system and method also includes accessing the entries in the definition scheme for the application such that the program accesses the customization data using the definition scheme and the configuration element entries.

Embodiments may include one or more of the following. The system and method can include storing aggregation entries in the definition scheme on the first computer system. The aggregation entries can define aggregation methods for multiple configuration element entries. The definition scheme can include aggregated properties and configuration elements. The definition scheme can include at least one of a property name, a reference, and an aggregation expression. The configuration elements can include at least one of an element type, a data type, a constraint, an access handler, and a selection expression. The system and method can include reading the definition scheme. The system and method can include processing the definition scheme and building an intermediate layer. The intermediate layer can be a proxy between the program and the customization data.

In another aspect, the invention features a computer program product, tangibly embodied in an information carrier, for deploying an application, the computer program product being operable to cause a data processing apparatus to store one or more configuration element entries in a definition scheme on a computer system included in a grid computer network. The configuration element entry can include data used by a program included in the computer system in the grid computer network to locate and access application specific customization data associated with an application on the computer system. The computer program produce can also be operable to access the entries in the definition scheme for the application such that the program accesses the customization data using the definition scheme and the configuration element entries.

Embodiments may include one or more of the following. The product can be operable to store aggregation entries in the definition scheme on the first computer system, the aggregation entries defining aggregation methods for multiple configuration element entries. The definition scheme can include aggregated properties and configuration elements. The definition scheme can include at least one of a property name, a reference, and an aggregation expression. The configuration elements can include at least one of an element type, a data type, a constraint, an access handler, and a selection expression. The product can be operable to read the definition scheme. The product can be operable to process the definition scheme and building an intermediate layer. The intermediate layer can be a proxy between the program and the customization data.

In another aspect, the invention features a system that includes a means for storing one or more configuration element entries in a definition scheme on a computer system included in a grid computer network. The configuration element entry can include data used by a program included in the computer system in the grid computer network to locate and access application specific customization data associated with an application on the computer system. The system also includes a means for accessing the entries in the definition scheme for the application such that the program accesses the customization data using the definition scheme and the configuration element entries.

Embodiments may include one or more of the following. The system can include a means for processing the definition scheme and building an intermediate layer. The intermediate layer can be a proxy between the program and the customization data.

In another aspect, the invention features a method including a step of storing one or more configuration element entries in a definition scheme on a computer system included in a grid computer network. The configuration element entry includes data used by a program included in the computer system in the grid computer network to locate and access application specific customization data associated with an application on the computer system. The method also includes a step of accessing the entries in the definition scheme for the application such that the program accesses the customization data using the definition scheme and the configuration element entries.

Embodiments may include one or more of the following. The method can include a step of processing the definition scheme and building an intermediate layer. The intermediate layer can be a proxy between the program and the customization data.

These and other embodiments may have one or more of the following advantages. A grid computing network can be extended and maintained with less effort.

To enable grid operation, a generic configuration scheme integrates grid relevant customization data located in different sources. This generic configuration allows binding of access handlers for specific source types and storing configuration data.

In a grid environment where the environment takes control over the application regarding its customization and parameterization, it can be advantageous to reflect application specific customizing data in a consistent way, integrated to a unique format, particularly, to overcome the heterogeneity of configuration syntax and semantics, storage types and access methods. This can be particularly advantageous for legacy systems (or applications) that were originally not designed to run in a grid environment.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
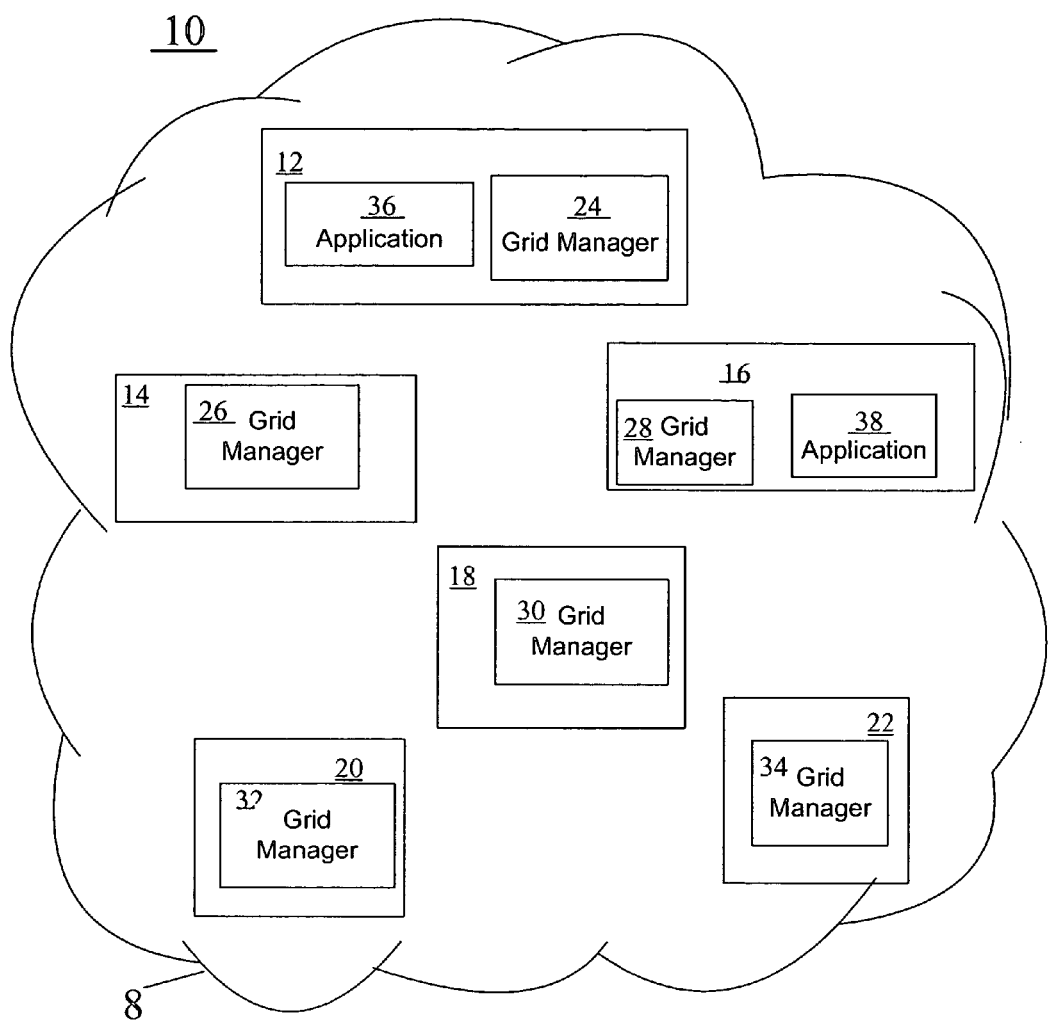
FIG. 1 is a block diagram of a grid computing environment.

As shown in FIG. 1, a grid computing environment 10 includes a set of distributed computing resources that can individually be requested by the applications 36 and 38 to perform computing or data retrieval tasks for the applications 36 and 38. The computational resources include computer devices 12, 14, 16, 18, 20, and 22. Each computer device 12, 14, 16, 18, 20, and 22 includes software to control the application. In this example, the software used to control the application in the grid environment is included in a grid manager (for example, grid managers 24, 26, 28, 30, 32, and 34). While in this example, the software to control the application is included in the grid manager, it could be included elsewhere on the computing device. The computer devices 12, 14, 16, 18, 20, and 22 can be arranged in a hierarchical, linear, or some other form of architecture to coordinate handling requests by the applications. Applications, for example application 36, include customization settings with application specific parameterization semantics to allow the application to operate on a computing device in the grid computing environment 10. The application, however, does not necessarily know it is being managed by the grid environment. Often, the customization settings and parameterization semantics are stored in different and diverse property files, configuration files, and application specific storages. In grid environment 10 where the environment 10 takes control over the application regarding its customization and parameterization, it is advantageous to reflect such application specific customizing data in a consistent way, integrated to a unique format.

In grid environment 10 not all configuration data is relevant to overall grid operation. Some configuration data remains static during execution of the application after the initial customizations of the application are completed while some configurations need to be dynamically adjusted. For example, the configurations might need to be adjusted as the grid environment 10 reallocates an application to a different computer device. In such a case, dependent configuration settings need to be adapted.

Figure 2:
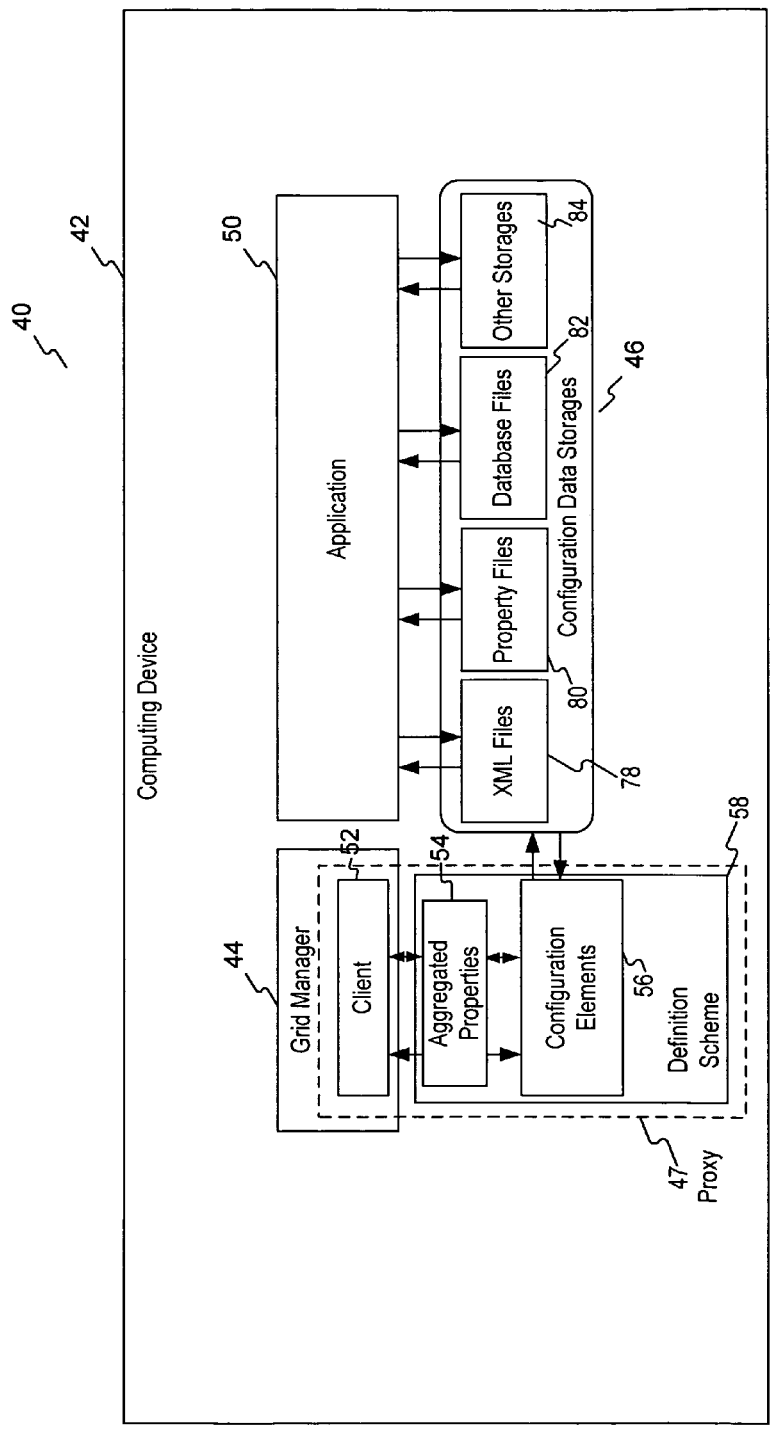
FIG. 2 is a block diagram of a computing device.

Referring to FIG. 2, a basic architecture 40 for storing configuration data is shown. A computing device 42 includes a grid manager 44 and an application 50. In order for a client to control an application, the client needs to access the configuration settings. The client can be the grid manager (e.g. grid manager 44) or another program that desires information about the customizing settings of a particular application. In a typical application, configuration settings can be stored in a variety of locations and formats and the application references configuration data stored in configuration data storages 46. For example, the configuration data storages 46 can include XML files 78, property files 80, database files 82, and other storages 84. If the client 52 were to access the configuration settings directly, when a change is made to the configurations settings the code for the client would need to be updated to reflect the change. Instead of referencing the configuration elements directly, the grid manager 44 references the configuration elements using an intermediate layer (e.g., proxy 47). The intermediate layer includes a client program 52, aggregated properties 54, configuration elements 56, and a definition scheme 58 (as described in FIG. 3). The proxy 47 includes references to configuration data stored on the computing device such that the grid manager 44 can reference the configuration elements using this intermediate layer (proxy 47) instead of accessing the configuration elements directly.

Figure 3:
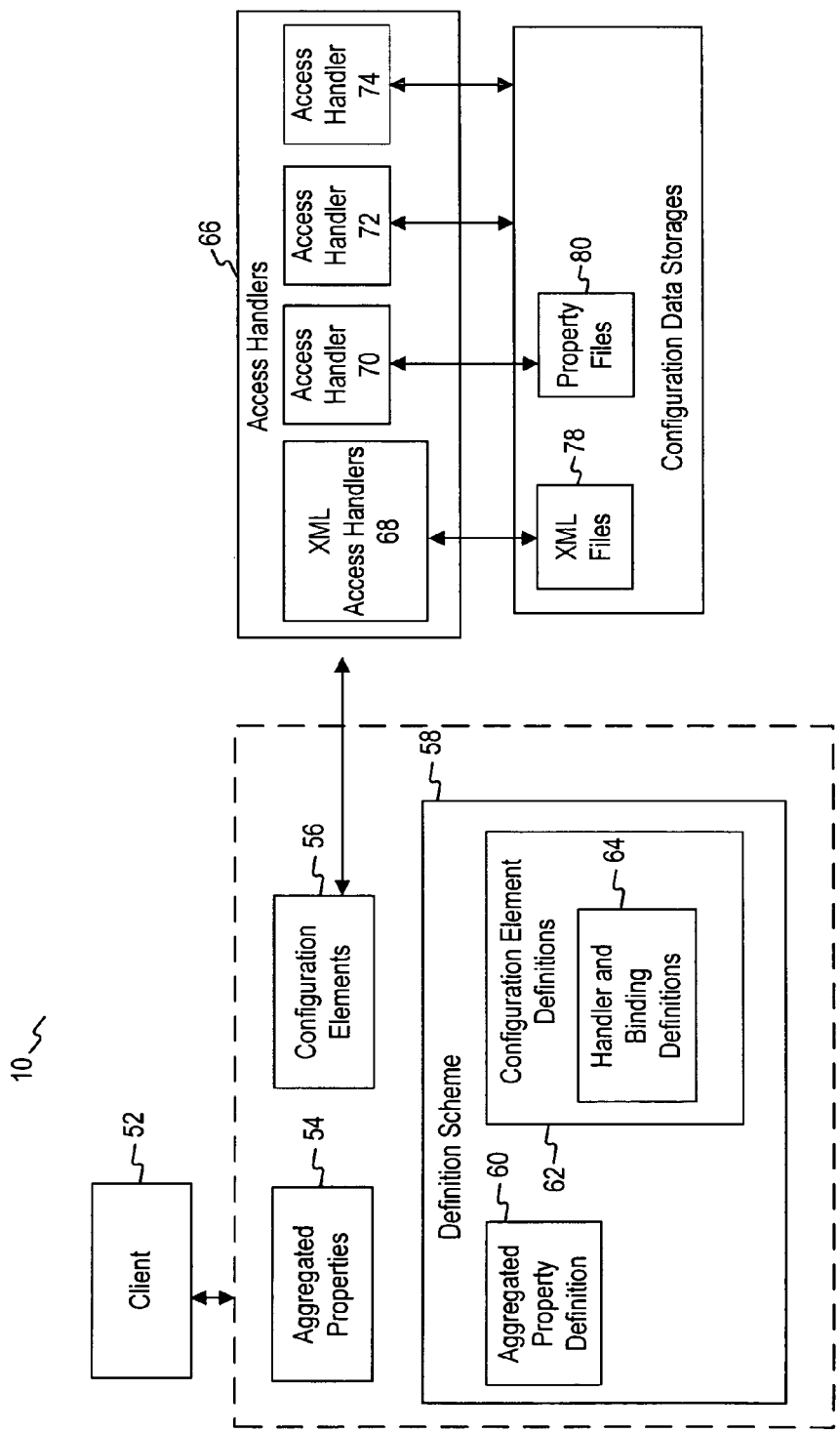
FIG. 3 is a block diagram of a definition scheme.

As shown in FIG. 3, instead of referencing the configuration data directly, client 52 references an intermediate layer. The intermediate layer includes aggregated properties 54 and configuration elements 56 for an application on a computer device in the grid environment 10. The aggregated properties 54 and configuration elements 56 are defined through a definition scheme 58 such that the client references the aggregated properties 54 and configuration elements 56 instead of referencing the configuration settings directly to control the application. The definition scheme 58 describes what configuration settings are present for an application, the names of the configuration settings, the access method, etc. The definition scheme 58 provides information to a client about how to access the configuration settings for a particular application. The use of an intermediate layer (containing configuration elements and aggregation properties) between the client and the customization settings provides the advantage of system flexibility. For example, if a particular configuration setting is changed (e.g., a server port configuration setting is changed from an XML file to a property file) the change is updated in the definition scheme. Since the client references the definition scheme and does not access the configuration settings directly the client software does not have to be updated or recompiled.

Within a particular computer system (e.g., computer devices 12, 14, 16, 18, 20, or 22), configuration settings can be stored in a variety of places. The configuration elements 56 can be associated with a set of access handlers 66. Individual access handlers 68, 70, 72, and 74 are linked to locations where the configuration data is stored. For example, access handler 68 is a handler for extensible markup language (XML) files and is linked to XML files 78 that include configuration data, access handler 70 is an access handler for property files and is linked to property files 80, and so forth. The definition scheme 58 provides a central location for the client to reference the configuration data by including references and descriptions of how to access the configuration data stored on the computer system for a particular application.

The definition scheme 58 includes aggregated property definitions 60 and configuration element definitions 62. The configuration element definitions 62 include handler definitions and binding definitions 64. The handler definitions and binding definitions 64 indicate a particular handler (e.g., a database or property file) associated with a configuration setting and how to access the data included in the handler. Configuration element definitions 62 represent concrete configuration properties or settings of the application while the aggregated property definitions 60 are generated from configuration elements or other aggregated properties 54. Both configuration element definitions 62 and aggregated property definitions 60 are represented in a consistent manner such that the client can access the configuration elements.

Figure 4:
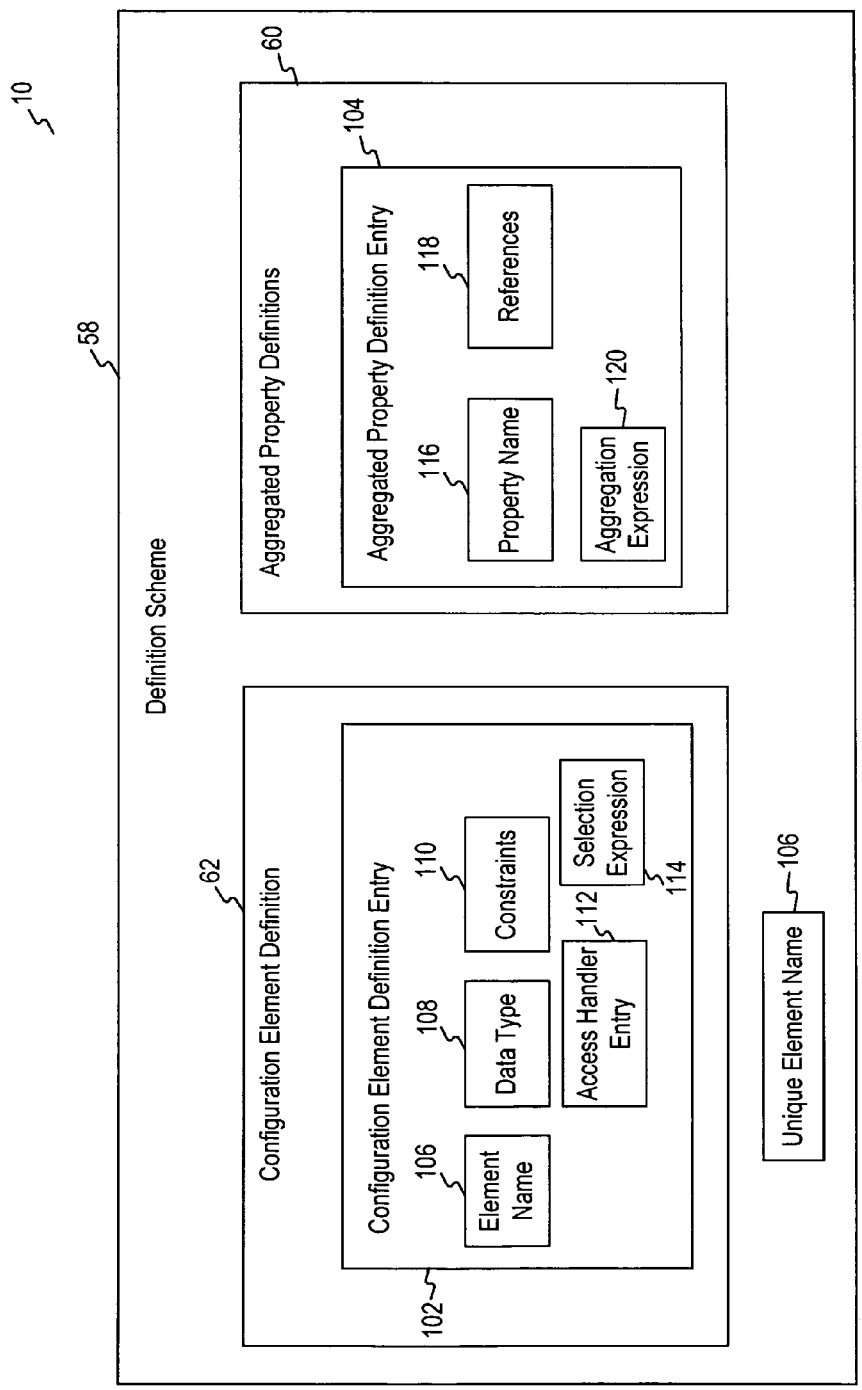
FIG. 4 is a block diagram of a configuration element and an aggregated property.

Referring to FIG. 4, information included in a configuration element definition entry 102 and an aggregated property definition entry 104 is shown. Multiple configuration element definition entries 102 are stored in the configuration element definitions 62, likewise, multiple aggregated property definition entries 104 are stored in the aggregated property definitions 60. Both configuration element definition entries 102 and aggregated property definition entries 104 are used by a Grid Manager or by any other program to determine customizations and settings for the execution of an application on a particular computer device in grid environment 10.

The configuration element definition entry 102 includes an element name 106, data type 108, constraints 110, access handler entry 112, and selection expression 114. Within the definition scheme 58, a unique element name 106 is used to reference each configuration element definition entry 102. A user defines the unique element name 106 or the computer device generates the unique element name 106 based on a predefined set of naming rules. Referencing each element by a unique name 106 ensures that the configuration properties for a particular application are not confused with the configuration properties for a different application. The data type 108 describes the element value. Examples of data types 108 include Integer, Double, Float, String or other atomic data types. The constraints 110 represent conditions to maintain consistency. For example, a constraint may restrict the value of a configuration element depending on values of other configuration elements. The access handler entry 112 describes the source of the configuration element. For example, the access handler entry 112 describes the type of access handler (e.g. handlers 68, 70, 72 and 74) and the location of the configuration data source (e.g. the path to the XML-File, property file or the URL of a database). The selection expression 114 specifies how to access particular configuration and customization data in the configuration data source. Selection expressions vary dependent on the type of the source. For example, if an element references an entry in a database the selection expression is an SQL "select" statement. However, an SQL select statement would not be appropriate to access a property file. Instead, to access a property file the selection expression 114 includes the property name included in the property file.

An aggregated property element definition entry 104 includes a property name 116, references 118, and an aggregation expression 120. Within the definition scheme 58, each aggregated property element definition entry 104 is uniquely referenced by a property name 116. The references 118 include references to configuration elements or other aggregated properties. The aggregation expression 120 specifies the formula of the aggregation.

Figure 5:
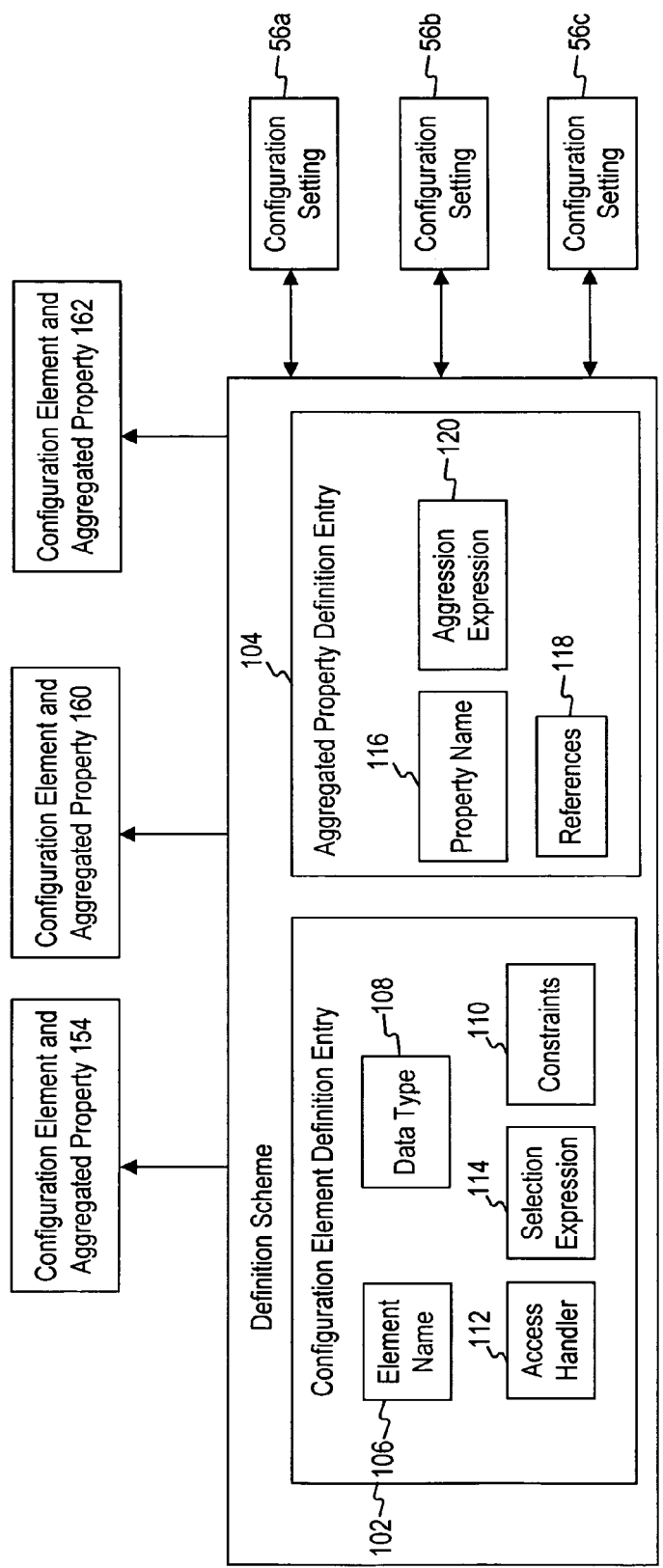
FIG. 5 is a block diagram of a definition scheme.

Referring to FIG. 5, an example of a definition scheme 58 is shown. In this example, XML code is used to express both the configuration elements and the aggregated properties (shown in blocks 154, 160, and 162). However, other expressions or programming languages can be used. As seen in this example, multiple configuration settings are stored in various locations 56a-c. These configuration settings are specified (or described) in the definition scheme 58.

The following is an example of a configuration element definition entry 102:

```
<configuration-element name="4">
    <access-handler type="database">
    <property name="url" value="jdbc:odbc:...">
    <selection expression="SELECT C2 FROM ..."/>
    <access-handler>
</configuration-element>
```

In this example, the configuration element includes expressions for the element name 106, data type 108, access handler 112, and a selection expression 114. In this example, the uniquely identifying element name is "4." The configuration data is stored in a database as denoted by the access handler type of "database." The property "jdbc:odbc:" in this example is used to locate the database in means of an URL (Unified Resource Locator) expression. Since the configuration element is from a database, the selection expression is listed as an SQL statement of "SELECT C2 FROM . . . " This statement tells how to access the configuration data for the element. No constraints 110 are included in this particular example of a configuration element.

The following is an example of a property element definition entry 104:

```
<aggregated-property name="2">
    <reference name="3" type="configuration-element"/>
    <reference name="4" type="configuration-element"/>
    <aggregation expression="${3}+${4}"/>
</aggregated-property>
```

In this example, the aggregated property element includes expressions for the element 104, a property name 116, references 118, and an aggregation expression 120. The property name is "2." This aggregated property element references two configuration elements, elements "3" and "4". An aggregation expression of "${3}+${4}" defines the relationship between the two configuration elements, meaning that the aggregated property with name "2" has a value which is an addition of the values of the configuration elements "3" and "4".

Returning now to FIG. 1, network 8 can be implemented in a variety of ways. The network 8 includes any kind and any combination of networks such as an Internet, a local area network (LAN) or other local network, a private network, a public network, a plain old telephone system (POTS), or other similar wired or wireless networks. Communications through the network 8 may be secured with a mechanism such as encryption, a security protocol, or other type of similar mechanism. Communications through the network 8 can include any kind and any combination of communication links such as modem links, Ethernet links, cables, point-to-point links, infrared connections, fiber optic links, wireless links, cellular links, Bluetooth®, satellite links, and other similar links.

The network 8 is simplified for ease of explanation. The network 8 can include more or fewer additional elements such as networks, communication links, proxy servers, firewalls or other security mechanisms, Internet Service Providers (ISPs), gatekeepers, gateways, switches, routers, hubs, client terminals, and other elements.

Computer devices 12, 14, 16, 18, 20, and 22 communicate over medium 10 using one of many different networking protocols. For instance, one protocol is Transmission Control Protocol/Internet Protocol (TCP/IP) combined with SOAP (Simple Object Access Protocol).

Embodiments of the invention can be implemented in digital electronic circuitry, or in computer hardware, firmware, software, or in combinations of them. Embodiment of the invention can be implemented as a computer program product, i.e., a computer program tangibly embodied in an information carrier, e.g., in a node-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of embodiments of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Other embodiments are within the scope of the following claims.

What is claimed is:

1. A method comprising:
    storing configuration settings, in a grid computer network, used to control and customize a plurality of applications operating in the grid computer network;
    generating, in a computer system in the grid computer network, a proxy layer including a definition scheme that:
        describes names of the configuration settings by defining configuration element entries that correspond to the configuration settings, one of the configuration element entries being an application-specific configuration element entry and corresponding to one of the configuration settings used to control and customize a specific application from the plurality of applications; and
        links the application-specific configuration setting with an application-specific access handler, the access handler directly linked and providing access to the application-specific configuration setting;
    accessing the application-specific configuration element entry in the definition scheme such that the application-specific configuration element entry directs the access, via the application-specific access handler, to the application-specific configuration setting; and
    customizing the specific application by using the accessed application-specific configuration setting.

2. The method of claim 1 further comprising storing aggregation entries in the definition scheme on the computer system, the aggregation entries defining aggregation methods for multiple configuration element entries.

3. The method of claim 1 wherein the definition scheme includes aggregated properties.

4. The method of claim 3 wherein the definition scheme includes at least one of a property name, a reference, and an aggregation expression.

5. The method of claim 3 wherein the configuration element entries include at least one of an element type, a data type, a constraint, and a selection expression.

6. The method of claim 1 further comprising reading the definition scheme.

7. The method of claim 1 further comprising processing the definition scheme and building an intermediate layer.

8. The method of claim 7 wherein the intermediate layer is the proxy the layer between the specific application and the application-specific configuration setting.

9. A computer program product, tangibly embodied in a computer-readable storage medium, the storage medium comprising instructions which when executed on a data processing apparatus cause the data processing apparatus to:
store configuration settings, in a grid computer network, used to control and customize a plurality of applications operating in the grid computer network;
generate, in a computer system in the grid computer network, a proxy layer including a definition scheme that:
describes names of the configuration settings by defining configuration element entries that correspond to the configuration settings, one of the configuration element entries being an application specific configuration element entry and corresponding to one of the configuration settings used to control and customize a specific application from the plurality of applications; and
links the application-specific configuration setting with an application-specific access handler, the access handler directly linked and providing access to the application-specific configuration setting;
access the application-specific configuration element entry in the definition scheme such that the application-specific configuration element entry directs the access, via the application-specific access handler, to the application-specific configuration setting; and
customize the specific application by using the accessed application-specific configuration setting.

10. The product of claim 9, the product being operable to store aggregation entries in the definition scheme on the computer system, the aggregation entries defining aggregation methods for multiple configuration element entries.

11. The product of claim 9 wherein the definition scheme includes aggregated properties.

12. The product of claim 9 wherein the definition scheme includes at least one of a property name, a reference, and an aggregation expression.

13. The product of claim 9 wherein the configuration element entries include at least one of an element type, a data type, a constraint, an access handler, and a selection expression.

14. The product of claim 9, the product being operable read the definition scheme.

15. The product of claim 9, the product being operable process the definition scheme and building an intermediate layer.

16. The product of claim 15 wherein the intermediate layer is the proxy layer between the specific application and the application-specific configuration setting.

17. A system comprising:
means for storing configuration settings, in a grid computer network, used to control and customize a plurality of applications operating in the grid computer network;
means for generating, in a computer system in the grid computer network, a proxy layer including a definition scheme that:
describes names of the configuration settings by defining configuration element entries that correspond to the configuration settings, one of the configuration element entries being an application-specific configuration element entry and corresponding to one of the configuration settings used to control and customize a specific application from the plurality of applications; and
links the application-specific configuration setting with an application-specific access handler, the access handler directly linked and providing access to the application-specific configuration setting;
means for accessing the application-specific configuration element entry in the definition scheme such that the application-specific configuration element entry directs the access, via the application-specific access handler, to the application-specific configuration setting; and
means for customizing the specific application by using the accessed application-specific configuration setting.

18. The system of claim 17 further comprising a means for processing the definition scheme and building an intermediate layer.

19. The system of claim 17 wherein the intermediate layer is the proxy layer between the specific application and the application-specific configuration setting.

20. A method comprising the steps of:
a step of storing configuration settings, in a grid computer network, used to control and customize a plurality of applications operating in the grid computer network;
a step of generating, in a computer system in the grid computer network, a proxy layer including a definition scheme that:
describes names of the configuration settings by defining configuration element entries that correspond to the configuration settings, one of the configuration element entries being an application-specific configuration element entry and corresponding to one of the configuration settings used to control and customize a specific application from the plurality of applications; and
links the application-specific configuration setting with an application-specific access handler, the access handler directly linked and providing access to the application-specific configuration setting;
a step of accessing the application-specific configuration element entry in the definition scheme such that the application-specific configuration element entry directs the access, via the application-specific access handler, to the application-specific configuration setting;
a step of customizing the specific application by using the accessed application-specific configuration setting; and
a step of processing the definition scheme and building an intermediate layer which is the proxy layer between the specific application and the application-specific configuration setting.

21. The method of claim 1, wherein, when the one configuration setting is changed in the grid computer network, the application-specific configuration element entry is changed in the definition scheme.

22. The system of claim 17, wherein, when the one configuration setting is changed in the grid computer network, the application-specific configuration element entry is changed in the definition scheme.

* * * * *